US006820706B2

(12) United States Patent
Ovshinsky et al.

(10) Patent No.: US 6,820,706 B2
(45) Date of Patent: Nov. 23, 2004

(54) METHOD AND SYSTEM FOR HYDROGEN POWERED INTERNAL COMBUSTION ENGINE (75) Inventors: Stanford R. Ovshinsky, Bloomfield Hills, MI (US); Robert C. Stempel, Oxford, MI (US); Richard O. Geiss, Dexter, MI (US); Bruce A. Webster, Rochester, MI (US); Ian Kinoshta, West Bloomfield, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 0 days.

(21) Appl. No.: 10/170,141

(22) Filed: Jun. 12, 2002

(65) Prior Publication Data

US 2003/0056510 A1 Mar. 27, 2003

Related U.S. Application Data (63) Continuation-in-part of application No. 09/963,864, filed on Sep. 25, 2001, now Pat. No. 6,565,836.

(51) Int. Cl.⁷ ................................................. B60K 6/02
(52) U.S. Cl. ....................... 180/65.1; 180/65.2; 123/3
(58) Field of Search ............................. 180/65.1, 65.2, 180/65.3, 65.4; 123/3, 261

(56) References Cited

U.S. PATENT DOCUMENTS

| | | | | |
|---|---|---|---|---|
| 3,897,757 | A | * 8/1975 | Abello | 123/1 A |
| 3,982,878 | A | * 9/1976 | Yamane et al. | 431/2 |
| 4,103,653 | A | * 8/1978 | Ueno et al. | 123/406.11 |
| 4,141,326 | A | * 2/1979 | Wolber | 123/684 |
| 4,167,919 | A | * 9/1979 | Woolley et al. | 123/1 A |
| 4,226,213 | A | 10/1980 | Bernauer | |
| 4,784,098 | A | * 11/1988 | Artman | 123/262 |
| 5,076,229 | A | * 12/1991 | Stanley | 123/289 |
| 5,183,011 | A | 2/1993 | Fujii et al. | |
| 5,413,075 | A | 5/1995 | Mamiya et al. | |
| 5,522,357 | A | * 6/1996 | Nogi et al. | 123/261 |
| 5,680,764 | A | * 10/1997 | Viteri | 60/716 |
| 5,765,656 | A | * 6/1998 | Weaver | 180/65.3 |
| 5,785,136 | A | * 7/1998 | Falkenmayer et al. | 180/65.2 |
| 5,797,269 | A | * 8/1998 | Nishimura et al. | 62/46.2 |
| 5,953,907 | A | * 9/1999 | Kato et al. | 60/274 |
| 5,953,922 | A | * 9/1999 | Stetson et al. | 62/46.2 |
| 6,209,672 | B1 | * 4/2001 | Severinsky | 180/65.2 |
| 6,275,004 | B1 | * 8/2001 | Tamai et al. | 320/118 |
| 6,289,877 | B1 | 9/2001 | Weisbrod et al. | |
| 6,293,110 | B1 | * 9/2001 | Stetson et al. | 62/46.2 |
| 6,311,680 | B1 | * 11/2001 | Bradley et al. | 123/672 |
| 6,330,925 | B1 | * 12/2001 | Ovshinsky et al. | 180/65.3 |
| 6,536,547 | B1 | * 3/2003 | Meaney, Jr. | 180/65.2 |
| 6,557,655 | B2 | * 5/2003 | Ovshinsky et al. | 180/65.3 |
| 6,565,836 | B2 | * 5/2003 | Ovshinsky et al. | 424/69 |
| 6,578,649 | B1 | * 6/2003 | Shimasaki et al. | 180/65.2 |
| 6,602,639 | B1 | * 8/2003 | Nakamura | 429/218.2 |

* cited by examiner

*Primary Examiner*—Christopher P. Ellis
*Assistant Examiner*—Christopher Bottorff
(74) *Attorney, Agent, or Firm*—Frederick W. Mau, II; Marvin S. Siskind (57) ABSTRACT

A hybrid vehicle having a hydrogen powered internal combustion engine employing a cylinder deactivation strategy during idle or light load conditions. A continuous stream of air is supplied to the hydrogen internal combustion engine. A control system responsive to engine speed and accelerator pedal position calculates a specific amount of hydrogen to inject into the continuous air stream. The resulting stream is combusted in the engine to provide power to the vehicle. During idling or light load conditions, the hydrogen supply to one or more cylinders may cease while maintaining the flow of air to the cylinders. A rechargeable battery and an electric motor receiving power from the battery are used to supplement the hydrogen powered internal combustion engine.

17 Claims, 6 Drawing Sheets

METHOD AND SYSTEM FOR HYDROGEN POWERED INTERNAL COMBUSTION ENGINE

RELATED APPLICATIONS

The present invention is a continuation-in-part of U.S. patent application Ser. No. 09/963,864, which is assigned to the same assignee as the current application, entitled "A Very Low Emission Hybrid Vehicle Incorporating An Integrated Propulsion System Including A Hydrogen Powered Internal Combustion Engine And A High Power Ni-MH Battery Pack", filed Sep. 25, 2001, now U.S. Pat. No. 6,565,836 the disclosure of which is hereby incorporated by reference.

FIELD OF THE INVENTION

The present invention generally relates to a very low emission hybrid electric vehicle incorporating an integrated propulsion system. More particularly, the present invention relates to a hydrogen powered internal combustion engine for use in the hybrid vehicle. The hydrogen powered internal combustion hydrogen engine operates without a throttle and utilizes a cylinder deactivation strategy to reduce power under idle and light load conditions.

BACKGROUND

As the world's population expands and its economy increases, the atmospheric concentrations of carbon dioxide are warming the earth causing climate change. However, the global energy system is moving steadily away from the carbon-rich fuels whose combustion produces the harmful gas. Experts say atmospheric levels of carbon dioxide may be double that of the pre-industrial era by the end of the next century, but they also say the levels would be much higher except for a trend toward lower-carbon fuels that has been going on for more than 100 years. Furthermore, fossil fuels cause pollution and are a causative factor in the strategic military struggles between nations.

For nearly a century and a half, fuels with high amounts of carbon have progressively been replaced by those containing smaller and smaller amounts of carbon. First wood, which is high in carbon, was eclipsed in the late $19^{th}$ century by coal, which contains less carbon. Then oil, with a lower carbon content still, dethroned "King Coal" in the 1960's. Now analysts say that natural gas, lighter still in carbon, may be entering its heyday, and that the day of hydrogen—providing a fuel with no carbon at all—may at last be about to dawn. As a result, experts estimate the world's economy today burns less than two-thirds as much carbon per unit of energy produced as it did in 1860.

In the U.S., it is estimated, that the trend toward lower-carbon fuels combined with greater energy efficiency has, since 1950, reduced by about half the amount of carbon spewed out for each unit of economic production. Thus, the decarbonization of the energy system is the single most important fact to emerge from the last 20 years of analysis of the system. It had been predicted that this evolution will produce a carbon-free energy system by the end of the $21^{st}$ century. The present invention shortens that period to a matter of years. In the near term, hydrogen will be used in fuel cells for cars, trucks and industrial plants, just as it already provides power for orbiting spacecraft. But ultimately, hydrogen will also provide a general carbon-free fuel to cover all fuel needs.

As noted in recent newspaper articles, large industries, especially in America, have long been suspicious of claims that the globe is warming and have vociferously negated the science of climate change. Electric utilities have even tried to stoke fears among ordinary folk that international treaties on climate change would cut economic growth and cost jobs. Therefore, it is very encouraging that some of the world's biggest companies, such as Royal Dutch/Shell and BP Amoco, two large European oil firms, now state plainly what was once considered heresy: global warming is real and merits immediate action. A number of American utilities vow to find ways to reduce the harm done to the atmosphere by their power plants. DuPont, the world's biggest chemicals firm, even declared that it would voluntarily reduce its emissions of greenhouse gases to 35% of their level in 1990 within a decade. The automotive industry, which is a substantial contributor to emissions of greenhouse gases and other pollutants (despite its vehicular specific reductions in emissions), has now realized that change is necessary as evidenced by their electric and hybrid vehicles.

Hydrogen is the "ultimate fuel." In fact, it is considered by most to be "THE" fuel for the next millennium, and, it is inexhaustible. Hydrogen is the most plentiful element in the universe (over 95%) and was the first element created by the "Big-Bang." Hydrogen can provide an inexhaustible, clean source of energy for our planet which can be produced by various processes which split water into hydrogen and oxygen. The hydrogen can be stored and transported in solid state form. The instant patent application makes it possible to create a complete generation/storage/transportation/delivery system for such a hydrogen based economy. For example, economical, lightweight, triple-junction amorphous silicon solar cells (an invention pioneered by Stanford R. Ovshinsky, one of the instant inventors) such as those set forth in U.S. Pat. No. 4,678,679, (the disclosure of which is herein incorporated by reference) can be readily disposed adjacent a body of water, where their inherently high open circuit voltage can be used to dissociate water into its constituent gases, and collect the hydrogen so produced. Also, by placing these high efficiency solar panels on nearby farms, in water, or on land. Electricity can be generated to transport and pump the hydrogen into metal hydride storage beds that include the inventive metal hydride alloys disclosed herein. The ultra-high capacities of these alloys allow this hydrogen to be stored in solid form for transport by barge, tanker, train or truck in safe, economical form for ultimate use. Energy is the basic necessity of life and civilization for any society today and the use of hydrogen in the manner described herein as the basic source of energy would end wars fought for control of fossil fuels. Instead of "from well to wheel," the phrase now recited will be "from source to wheel."

In the past considerable attention has been given to the use of hydrogen as a fuel or fuel supplement. While the world's oil reserves are depletable, the supply of hydrogen remains virtually unlimited. Hydrogen can be produced from coal, natural gas and other hydrocarbons, or formed by the electrolysis of water, preferably via energy from the sun which is composed mainly of hydrogen and can itself be thought of as a giant hydrogen "furnace". Moreover hydrogen can be produced without the use of fossil fuels, such as by the electrolysis of water using nuclear or solar energy, or any other form of economical energy (e.g. wind, waves, geothermal, etc.). Furthermore, hydrogen, although presently more expensive than petroleum, is an inherently low cost fuel. Hydrogen has the highest density of energy per unit weight of any chemical fuel and is essentially non-polluting since the main by-product of "burning" hydrogen is water. Thus, hydrogen can be a means of solving many of the world's energy related problems, such as climate change, pollution, strategic dependency on oil, etc., as well as providing a means of helping developing nations.

While hydrogen has wide potential application as a fuel, a major drawback in its utilization, especially in mobile uses such as the powering of vehicles, has been the lack of acceptable lightweight hydrogen storage medium. Conventionally, hydrogen has been stored in pressure-resistant vessels under a high pressure or stored as a cryogenic liquid, being cooled to an extremely low temperature. Storage of hydrogen as a compressed gas or liquid involves the use of large and heavy vessels, making the use of hydrogen to power vehicles less feasible.

Alternatively, certain metals and alloys have been known to permit reversible storage and release of hydrogen. In this regard, they have been considered as a superior hydrogen-storage material, due to their high hydrogen-storage efficiency. Storage of hydrogen as a solid hydride can provide a greater volumetric storage density than storage as a compressed gas or a liquid in pressure tanks. Also, hydrogen storage in a solid hydride presents fewer safety problems than those caused by hydrogen stored in containers as a gas or a liquid. These alloys are fully described in U.S. Pat. No. 6,193,919, entitled "High Storage Capacity Alloys Enabling a Hydrogen-based Ecosystem", which is hereby incorporated by reference.

With these developments in the storage of hydrogen, hydrogen now has a viable use as a fuel to power vehicles. Solid-phase metal or alloy system can store large amounts of hydrogen by absorbing hydrogen with a high density and by forming a metal hydride under a specific temperature/pressure or electrochemical conditions, and hydrogen can be readily released by changing these conditions.

With hydrogen now being a viable source to power vehicles, considerable research has been performed on designing engines to run on hydrogen rather than fossil fuels. In these designs, a hydrogen mixture is combusted inside an internal combustion engine much like gasoline and other hydrocarbons are combusted in present day internal combustion engines. With hydrogen, however, catalytic converters are not needed to treat the hydrocarbons and carbon monoxide present in the exhaust to comply with emission standards.

Internal combustion engines using gasoline or other hydrocarbon fuels typically rely on catalyst and exhaust composition sensors to comply with emission standards. It is not practical in those engines to reduce or eliminate fuel flow to one or more cylinders without also reducing or eliminating airflow in proportion (i.e. a uniform air fuel ratio must be maintained in all cylinders for exhaust composition sensors and catalysts to function effectively). The presence of air in the exhaust makes those devices less effective. Hydrogen internal combustion engines do not require exhaust hydrocarbon or carbon monoxide catalysts, so they can continue to operate cleanly when the fuel input to one or more cylinders is reduced or eliminated. In the present invention, fuel cutoff to specific cylinders is utilized to reduce engine power during periods of low power demand such as idling or when engine is under light load.

As an alternative to vehicles powered solely by internal combustion engines, hybrid-electric vehicles (HEVs) have gained popularity as having the technical capability to meet the goal of tripling auto fuel economy in the next decade. Hybrid vehicles utilize the combination of an internal combustion engine and an electric motor driven from a battery and have been proposed in a variety of configurations.

Hybrid systems have been divided into two broad categories, namely series and parallel systems. In a typical series system, an electric propulsion motor is used to drive the vehicle and the engine is used to recharge the battery. In a parallel system, both the combustion engine and the electric motor are used to drive the vehicle and can operate in parallel for this purpose.

There are further variations within these two broad categories. For example, there are systems which employ a combination of the series and parallel systems. In the so-called "dual mode" system, the propulsion mode can be selected, either by the operator or by a computer system, as either an "all electric" or "all engine" mode of propulsion. In the "range extender" system, a primarily electric system is used for propulsion and the engine is used for peak loads and/or for recharging the battery. In the "power assist" system, peak loads are handled by the battery driven electric motor.

A further division is made between systems which are "charge depleting" in the one case and "charge sustaining" in another case. In the charge depleting system, the battery charge is gradually depleted during use of the system and the battery thus has to be recharged periodically from an external power source, such as by means of connection to public utility power. In the charge sustaining system, the battery is recharged during use in the vehicle, through regenerative braking and also by means of electric power supplied from a generator driven by the engine so that the charge of the battery is maintained during operation.

There are many different types of systems that fall within the categories of "charge depleting" and "charge sustaining" and there are thus a number of variations within the foregoing examples which have been simplified for purposes of a general explanation of the different types. However, it is to be noted in general that systems which are of the "charge depleting" type typically require a battery which has a higher charge capacity (and thus a higher specific energy) than those which are of the "charge sustaining" type if a commercially acceptable driving range (miles between recharge) is to be attained in operation. Further and more specific discussion of the various types of HEV systems, including "series", "parallel" and "dual mode" types, and of the present invention embodied in such systems will be presented below.

In the present application, the terms "hydrogen powered internal combustion engine", "combustion engine", "engine", and "HP-ICE" are used to refer to engines utilizing hydrogen fuel.

The use of hybrid drive systems offers critical advantages for both fuel economy and ultra-low emissions. Combustion engines achieve maximum efficiency and minimal emissions when operated at or near the design point speed and load conditions. Small electric motors are capable of providing very high peak torque and power. Thus, the ability to use a small combustion engine operating at maximum efficiency coupled with an electric motor operating at maximum efficiency offers an outstanding combination for minimizing emissions, providing excellent fuel economy, and maximizing acceleration.

A key enabling technology for HEVs is an energy storage system capable of providing very high pulse power a combined with high energy density while at the same time accepting high regenerative braking currents at very high efficiency. In addition, the duty cycle of a peak power application requires exceptional cycle life at low depths of discharge, particularly in charge depleting systems.

It is important to understand the different requirements for this energy storage system compared to those for a pure electric vehicle. Range is the critical factor for a practical EV, making energy density the critical evaluation parameter. Power and cycle life are certainly important, but they become secondary to energy density for an EV. A lightweight, compact, high-capacity battery is the target for pure EV applications.

An example of such a battery is the Ovonic Nickel Metal Hydride (NiMH) battery. The Ovonic Nickel Metal Hydride (NiMH) battery has reached an advanced stage of development for EVs. Ovonic electric vehicle batteries are capable of propelling an electric vehicle to over 370 miles (due to a specific energy of about 90 Wh/Kg), long cycle life (over 1000 cycles at 80% DOD), abuse tolerance, and rapid recharge capability (up to 60% in 15 minutes). Additionally, the Ovonic battery has demonstrated higher power density when evaluated for use as an EV stored energy source.

The present invention describes a hybrid vehicle having an innovative design for a hydrogen internal combustion engine. Unlike previous hydrogen internal combustion engines, the present invention does not use a throttle and utilizes a cylinder deactivation strategy during light load and idling conditions. The disclosed hydrogen powered internal combustion engine in conjunction with high powered Nickel Metal Hydride batteries provides a clean alternative to powering vehicles, bringing the world one step closer to a "Hydrogen Based Ecosystem".

SUMMARY OF THE INVENTION

The present invention discloses a hybrid vehicle including a hydrogen powered internal combustion engine, an electric motor for supplementing the hydrogen powered internal combustion engine, a source of hydrogen, a hydrogen fuel control system, and a rechargeable battery which is optionally a high powered rechargeable battery. The hydrogen internal combustion engine is designed to operate without a throttle. A continuous stream of air is delivered to the engine and divided into a plurality of smaller air streams each leading to a cylinder inside the engine. Prior to reaching the cylinders, a calculated amount of hydrogen is injected into each of the smaller air streams. The engine is operated at lean conditions to minimize $NO_x$ generation.

The amount of hydrogen injected into each air stream is calculated by a control system responsive to the position of the accelerator pedal and the speed of the engine. The control system incorporates an accelerator pedal position transducer to sense power requirement in response to an input from the vehicle operator.

The hydrogen internal combustion engine operates in a normal operation mode and a cylinder deactivation mode. During idling or light load conditions the hydrogen internal combustion engine operates in a cylinder deactivation mode. While in cylinder deactivation mode, one or more of the hydrogen fuel injectors cease injecting fuel into the air streams. While the hydrogen may no longer be injected into the air streams, the continuous stream of air remains unchanged and continues to flow through the engine.

An electric motor is used to supplement the hydrogen powered internal combustion engine. The electric motor is powered by a high energy density rechargeable battery. The battery may be recharged during operation of the hydrogen powered internal combustion engine. The battery system is modified to help compensate for the loss in power realized by fueling the internal combustion engine with hydrogen instead of hydrocarbon based fuels.

DETAILED DESCRIPTION OF THE INVENTION

The present invention discloses a hybrid vehicle with a hydrogen internal combustion engine (ICE) utilizing multiple strategies to optimize performance and fuel efficiency under a variety of conditions. The multiple strategies are used to optimize fuel consumption while minimizing or eliminating $NO_x$ emissions from the engine. The present invention is designed to operate at varying speeds depending on power requirements. The present invention also includes a battery system used in conjunction with an electric motor to supplement the hydrogen powered internal combustion engine in propelling the vehicle.

Figure 1:
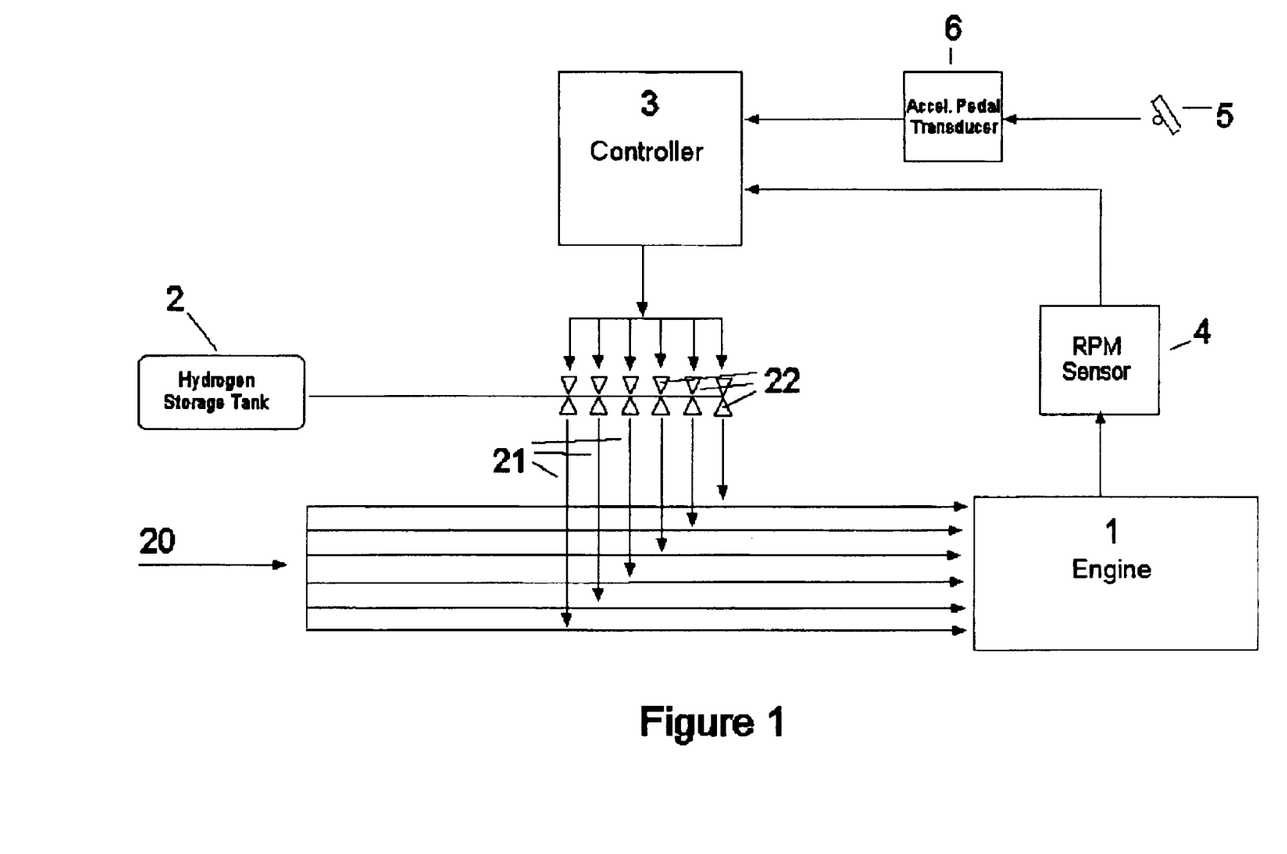
FIG. 1, shows a diagram of the hydrogen powered internal combustion engine and control system of the present invention.

The concept for the hydrogen engine system of the present invention is exemplified in FIG. 1. The system includes a hydrogen powered internal combustion engine 1, a source of hydrogen 2, and a control system 3. The control system 3 is responsive to the speed of the engine 1 as determined by an RPM sensor 4 and position of the accelerator pedal 5 as determined by an accelerator pedal position transducer 6.

During operation of the hydrogen powered internal combustion engine 1, a primary stream of air 20 is supplied to the hydrogen internal combustion engine 1. The primary air stream 20 does not use a throttle and maintains a continuous flow rate. The primary air stream 20 is divided into multiple secondary air streams 21 each leading to an engine cylinder. A hydrogen fuel injector 22 is connected to each secondary stream 21 and dispenses a calculated amount of hydrogen into each secondary air stream 21. During operation, the hydrogen fuel injectors are responsive to a control signal based upon the speed of the engine and the accelerator pedal position. In response to the control signal, the amount of hydrogen dispensed into the secondary air streams by the hydrogen fuel injectors may be increased, decreased, or remain unchanged.

Figure 2:
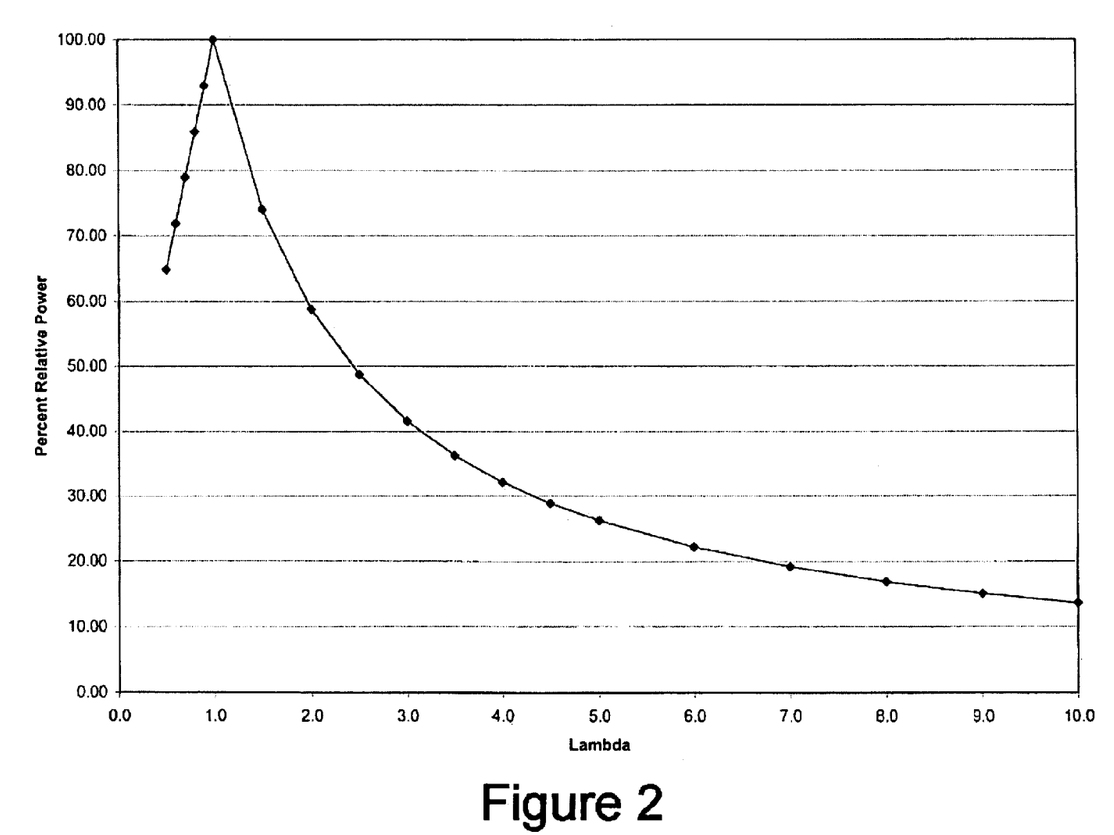
FIG. 2, shows the power output of the hydrogen engine of the present invention with respect to the Actual air-fuel ratio divided by the Stoichiometric air-fuel ratio.

The hydrogen powered internal combustion engine is operated lean to minimize $NO_x$ generation. The engine is operating lean where λ (Actual air-fuel ratio/Stoichiometric air-fuel ratio) is greater than 1. Conversely, the engine is running rich where λ is less than 1. The stoichiometric air-fuel ratio is approximately 34 kg air/kg $H_2$ for the combustion of hydrogen. At this ratio there is neither a shortage nor an excess of air needed to completely combust the hydrogen. FIG. 2. shows power output of the hydrogen engine of the present invention with respect to λ.

The hydrogen engine described in the present invention will operate with a λ value between 1 and 10. Preferably operation will be with a λ value between 3 and 8. Most preferably operation will be with a λ value between 5 and 7. Upon startup, the hydrogen engine may operate at a λ value of 1 to provide maximum power. After startup, the hydrogen engine may operate at a λ value greater than 2.5 to minimize $NO_x$ emissions.

The hydrogen powered internal combustion engine is comprised of multiple cylinders each having an intake valve and an exhaust valve. The intake valve and the exhaust valve are operated in relation to the combustion of hydrogen inside the cylinders. Pistons located inside the cylinders are used to compress the air/hydrogen mixture prior to combustion and are used to provide work to a crankshaft after combustion of the air/hydrogen mixture. The intake and exhaust valves are driven by a camshaft. The air/hydrogen mixture is fed into the cylinder through the intake valve. The intake valve closes and the piston compresses the air/hydrogen mixture and the mixture is ignited by a spark. Preferably the compression ratio for the hydrogen powered internal combustion engine will be 13:1, however other ratios may be used in the range of 12:1 to 15:1. The combustion of the air/hydrogen mixture forces the piston in a downward motion providing work to the crankshaft. The camshaft then opens the exhaust valve as the piston moves upward from the rotation of the crankshaft and forces the exhaust out of the cylinder.

Under idling conditions and light load conditions, cylinder deactivation may be used, rather than conventional engine throttling, to reduce power of the engine. Cylinder deactivation will eliminate the need for any throttling along with any increases in fuel consumption resulting from throttling. Cylinder deactivation may be accomplished by different approaches. The preferred approach is to simply cut off the fuel supply to one or more cylinders while maintaining the constant flow of air to each of the cylinders. Under this approach fuel injectors will dispense an amount of hydrogen to the air stream based upon power requirements calculated from the accelerator pedal position and the speed of the engine. Since the airflow remains unchanged, the net effect of cutting fuel to one or more cylinders is to essentially extend the lean operating limit of the hydrogen internal combustion engine beyond the point where all cylinders are fueled equally, thereby making it possible to reduce engine power without throttling.

An alternative approach to cylinder deactivation is to cut the air supply along with the fuel supply to one or more cylinders. This can be accomplished by interrupting actuation of the intake and exhaust valves in the affected cylinder(s) and requires implementation of a complex mechanism. Due to the complexity of this approach, this is not the preferred method of operation of the present invention. An intermediate approach to cylinder deactivation may be variable valve timing. Under this approach, the timing of the valves are maintained to reduce, but not eliminate, airflow through unfueled cylinders.

Figure 3:
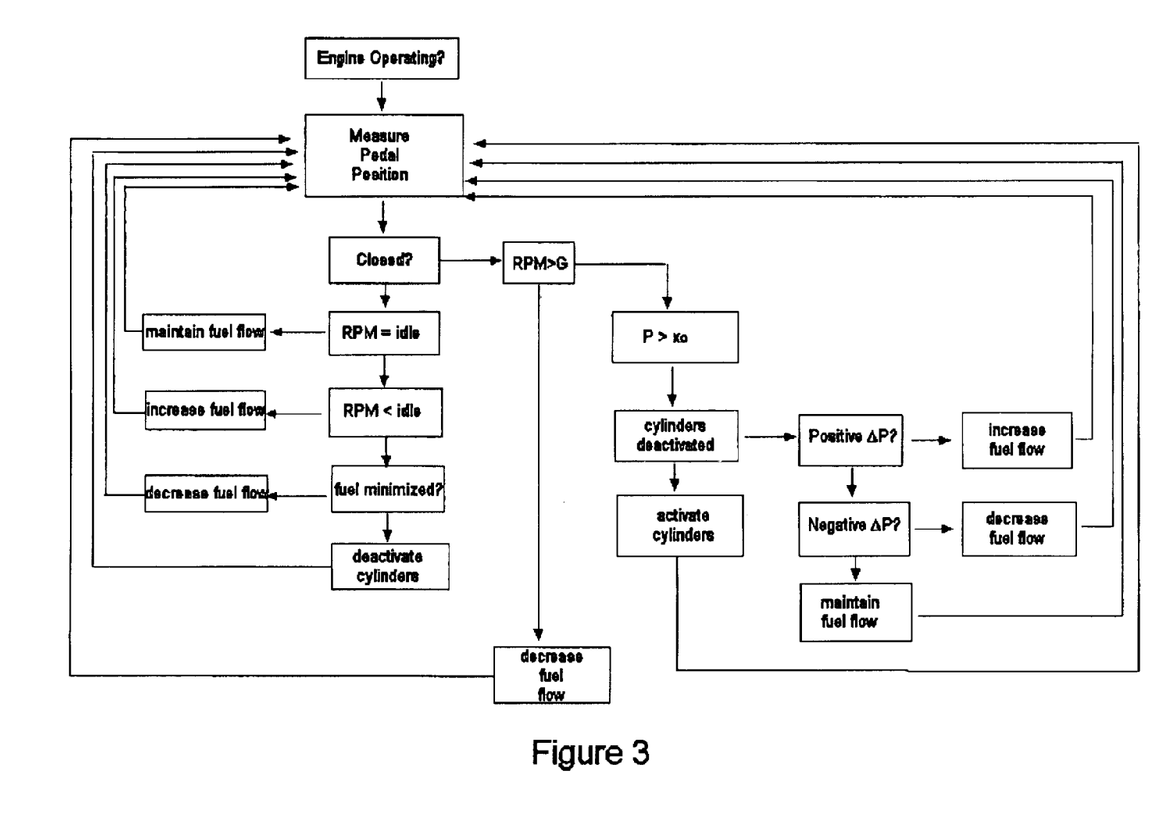
FIG. 3, shows a flow chart of the control system of the present invention.

A control system measuring speed from the engine, and the position of the accelerator pedal will be used to control the amount of hydrogen being injected into the cylinders. A flow chart showing the control loops during cylinder deactivation and normal operation is shown in FIG. 3 (flow chart). The control system begins once the hydrogen ICE begins operation. The control system first measures the accelerator pedal position (P). The accelerator pedal position represents the power desired by the vehicle operator. Based on the accelerator pedal position, the control system maintains normal operation of the hydrogen ICE or utilizes a cylinder deactivation strategy within the hydrogen ICE. During normal operation, the pedal position is measured and based upon the change in pedal position the fuel flow is increased or decreased. If the pedal is in the closed position (idle), the control system begins performing the cylinder deactivation strategy. If at any time the speed of the hydrogen powered internal combustion engine (RPMs) exceed a specified quantity (G), the fuel flow is decreased to prevent damage to the engine from overspeed.

Figure 4:
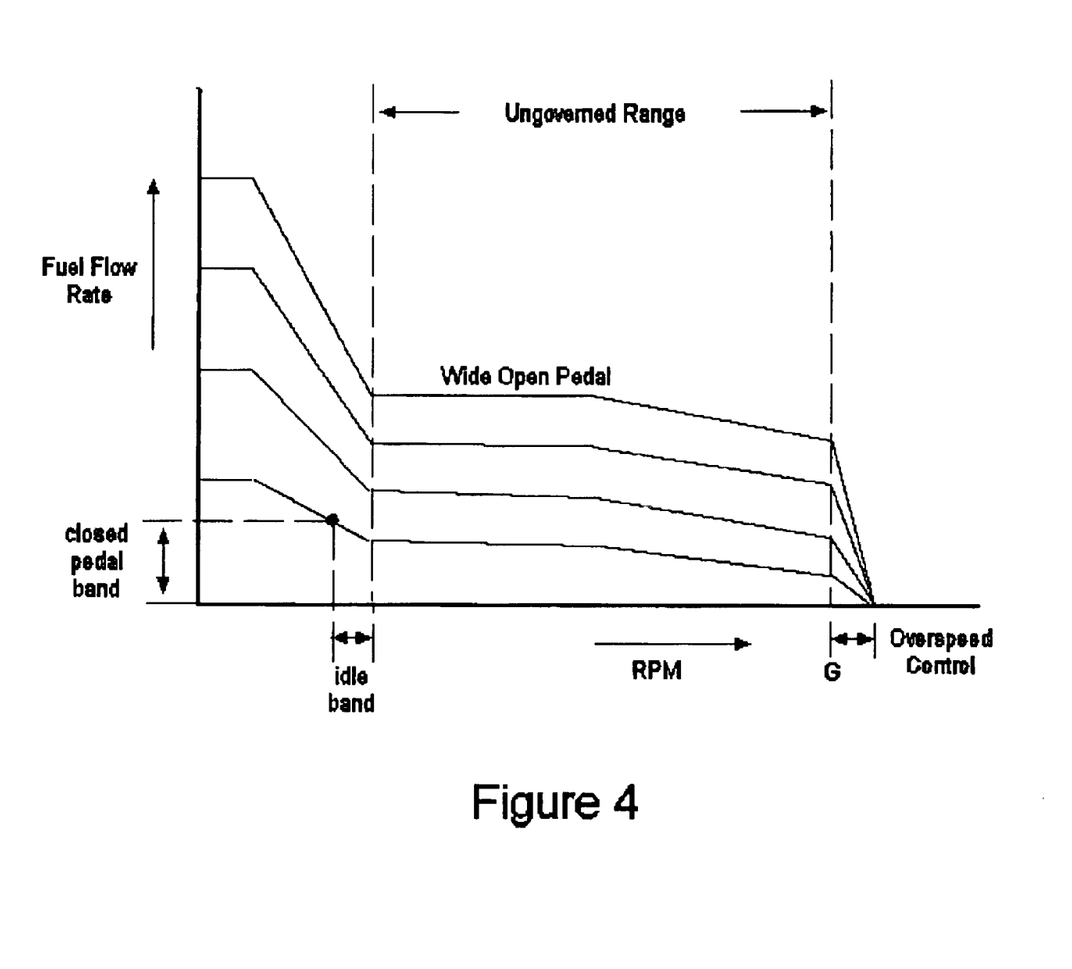
FIG. 4 shows a control map relating accelerator pedal position to the speed of the hydrogen internal combustion engine of the present invention.

The engine fueling control system may include an electric governor strategy control to control fuel delivery versus engine speed at idle and at maximum accelerator position (to prevent overspeeds and dieouts). At all other conditions, delivery and engine torque will be determined by driver accelerator pedal position as determined by a pedal transducer. A control map relating accelerator pedal position to engine speed is shown in FIG. 4.

The hydrogen will be provided to the hydrogen powered internal combustion engine from a metal hydride hydrogen storage unit. The exhaust from the engine may be used to aid in releasing the hydrogen from the metal hydride form. In such cases, the exhaust gas may pass through tubes in thermal contact with the hydrogen storage alloy or the vessel may be heated by the exhaust gases in another manner. The interior of such vessels may also be divided into compartments by thermally conductive materials to better accommodate heat transfer throughout the vessel and prevent densification and subsequent expansion of the hydrogen storage alloy (upon charging with hydrogen) which can cause strain to the wall of the vessel. Such hydrogen storage vessels are described in U.S. patent application Ser. No. 10/143,243, entitled "A Honeycomb Hydrogen Storage Structure", filed on May 9, 2002 the disclosure of which is herein incorporated by reference. Hydrogen may also be stored in vessels in gaseous or liquid form, however, these vessels impose greater safety risks and design constraints due to the extreme conditions needed to store the hydrogen within such vessels.

The alloys used within the metal hydride hydrogen storage unit may be any of those known in art for such purposes. Specific alloys include $AB_2$ and $AB_5$ alloys, such as rare earth-nickel alloys, titanium-manganese alloys, titanium-zirconium alloys, titanium-iron alloys, magnesium alloys, and the like. Examples of such alloys can be found in U.S. Pat. Nos. 6,193,929; 6,103,024; 5,976,276; 5,916,381; 5,840,440; 4,832,913; 4,431,561 and in U.S. patent application Ser. Nos. 09/573,240; 09/609,487; 09/902,320; 09/901,816; 09/444,812; 09/873,863, all of which are herein incorporated by reference.

One type of magnesium alloy is a high capacity, low cost, light weight thermal hydrogen storage alloy having fast kinetics in the form of a magnesium based hydrogen storage alloy powder. The alloy contains approximately 90 weight % magnesium or greater and has a) a hydrogen storage capacity of at least 6 weight %; b) absorption kinetics such that the alloy powder absorbs 80% of it's total capacity within 5 minutes at 300° C.; c) a particle size range of between 30 and 70 microns, and d) a proper microstructure. More preferably the alloy powder has a hydrogen storage capacity of at least 6.5 weight % and most preferably at least 6.9 weight %. Also, the alloy powder more preferably absorbs 80% of it's total capacity within 2 minutes at 300° C. and most preferably within 1.5 minutes. Modifiers elements added to the magnesium to produce the alloys mainly include Ni and Mm (misch metal) and can also include additional elements such as Al, Y and Si. Thus the alloys will typically contain 0.5–2.5 weight % nickel and about 1.0–4.0 weight % Mm (predominantly contains Ce and La and Pr). The alloy may also contain one or more of 3–7 weight % Al, 0.1–1.5 weight % Y and 0.3–1.5 weight % silicon.

Another example of a useful hydrogen storage alloy is a low temperature hydrogen storage alloy which is non-pyrophoric upon exposure to ambient atmosphere. The alloy particularly is non-pyrophoric even after hydrogen charge/discharge cycling. The alloy is an atomically engineered $TiMn_2$ type alloy. Preferred embodiments of the non-pyrophoric low temperature hydrogen storage alloy comprises titanium, zirconium, vanadium, chromium, and manganese. The alloy may further include iron and aluminum. Atomic engineering of the alloy includes adjusting the composition of the alloy to include increased chromium levels beyond that of conventional $TiMn_2$ alloys. That is, as the chromium content of the alloy increases, the tendency to be pyrophoric decreases. Particularly preferred alloy compositions comprise 0.5–10 at. % Zr, 29–35 at. % Ti, 10–15 at. % V, 13–20 at. % Cr, 32–38 at. % Mn, 1.5–3.0 at. % Fe, and 0.05–0.5 at. % Al. The alloy may further contain 1–10 at. % total of at least one element selected from the group consisting of Ba, Co, Cu, Cs, K, Li, Mm, Mo, Na, Nb, Ni, Rb, Ta, Ti, and W. Specific examples of useful alloys include the compositions $Zr_1 Ti_{33} V_{12.54} Cr_{15} Mn_{36} Fe_{2.25} Al_{0.21}$ and $Zr_{1.5} Ti_{32.5} V_{12.54} Cr_{15} Mn_{36} Fe_{2.25} Al_{0.21}$.

The hydrogen powered ICE of the present invention may also be used in conjunction with a battery for a hybrid electric vehicle (HEV). The battery is preferably a high power density nickel metal hydride battery, however other batteries having similar power densities may be used as well. In such a system, an electric motor would operate parallel to the hydrogen powered internal combustion engine. Both the electric motor and the hydrogen powered internal combustion engine would operate at maximum efficiency for powering the hybrid electric vehicle and providing for the charge and discharge of the nickel metal hydride batteries.

The hydrogen powered internal combustion engine and the metal hydride hydrogen storage unit work in combination with a battery pack and an electric motor to provide propulsion for the hybrid vehicle. The nickel-metal hydride batteries of the present invention are adapted to provide increased specific power and recharge rates that are particularly advantageous in HEV applications. These characteristics are provided while maintaining a high energy density. This is accomplished in the present invention through, inter alia, the use of positive and negative electrodes having increased internal conductance. Such electrodes are formed by pressing powdered metal-hydride active materials into highly conductive porous metal substrates. These porous metal substrates are formed from copper, a copper alloy, or nickel coated with copper or a copper alloy. Additionally, the substrate may be plated with a material that is electrically conductive and will prevent corrosion of the metal substrate in the battery environment, such as nickel.

It is important to understand the different requirements for this energy storage system compared to those for a pure electric vehicle (EV). Range is the critical factor for a practical electric vehicle, making energy density the critical evaluation parameter. Power and cycle life are certainly important, but they are secondary to energy density for an EV. A lightweight, compact, high-capacity battery is the target for pure EV applications.

In contrast, in HEV applications, gravimetric and volumetric power density is the overwhelming consideration. Excellent cycle life from 30 to 60% DOD (Depth of Discharge) is also more critical than cycle life at 80% DOD as required in EV applications. Similarly, rapid recharge is also essential to allow for efficient regenerative braking, and charge/discharge efficiency is critical to maintain battery state of charge in the absence of external charging. In addition, thermal management and excellent gas recombination are important secondary considerations to rapid recharging and multiple cycling.

Figure 5:
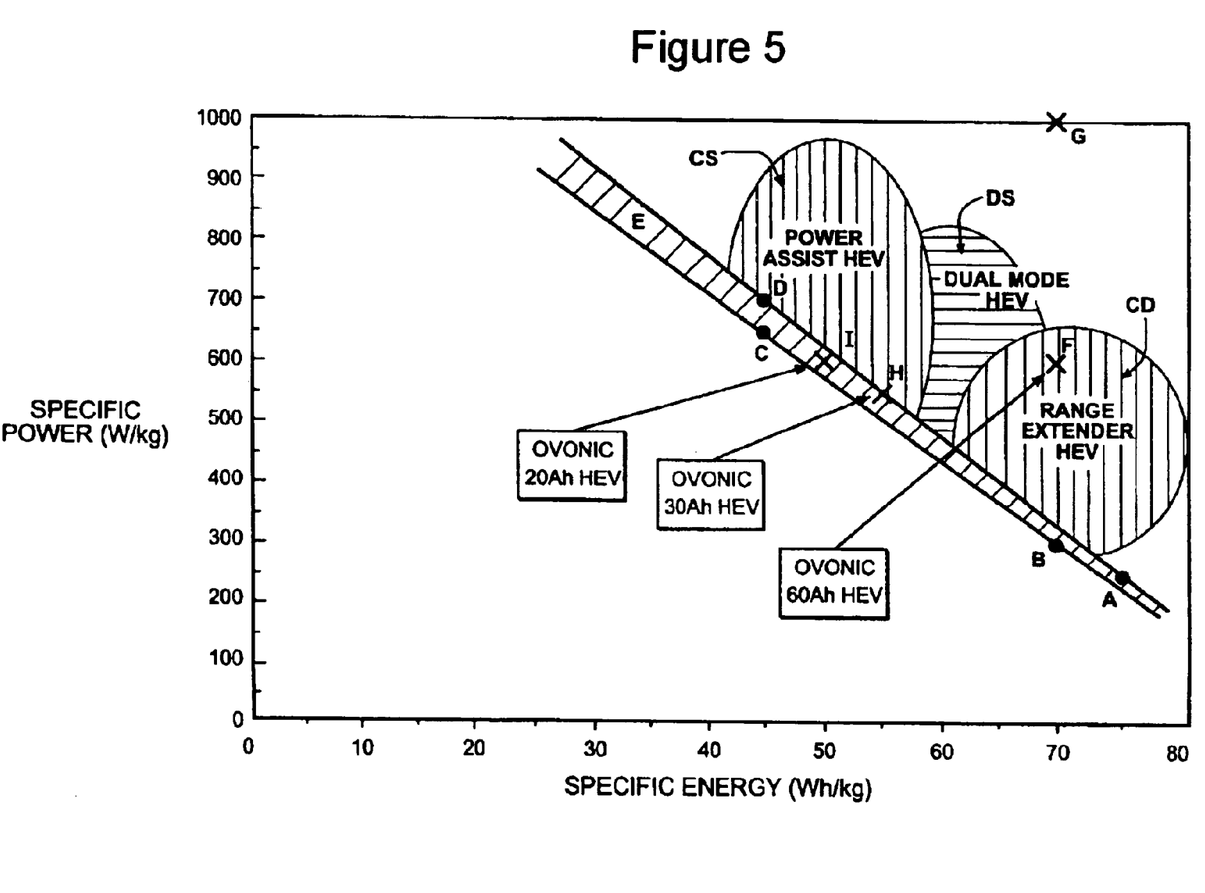
FIG. 5, is a graphical depiction of the relationship between peak power output and energy density of typical prior art nickel metal hydride batteries in comparison to the performance of the nickel metal hydride batteries of the present invention for various HEV applications.

With reference to FIG. 5, prior art NiMH batteries designed for use in HEV applications have shown a maximum attainable energy density of about 75 Wh/Kg while providing a peak power density capability of about 250 W/Kg. This combination of energy density and peak power density is shown at point A in FIG. 5. Allowing for some minor engineering improvements, the peak power density attainable with prior art NiMH batteries at this energy density might be increased to about 300 W/Kg with an energy density of about 70 Wh/Kg, which is shown at point B in FIG. 5. In order to increase the peak power density of such prior art batteries for use in HEV systems, it is necessary to sacrifice energy density as a trade off in order to attain a higher peak power density. This, in turn, decreases the energy density of the battery so that, for example, as the peak power density is increased from 250 W/Kg to about 650 W/Kg for better HEV performance, the energy density is decreased from about 70 Wh/Kg to about 45 Wh/Kg, as shown at point C in FIG. 5. Again, allowing for some engineering improvement, the peak power density attainable at 45 Wh/Kg might be increased to about 700 W/Kg, which is point D in FIG. 5.

These points A, B, C and D define a band E which represents the upper limit of the region P (which region defines combinations of both high power density and high energy density) attainable with prior art NiMH batteries for use in HEV systems. The present invention provides improved performance in the region N yielding a unique combination of both higher energy density and higher power density than has been possible to attain in battery modules adapted for use in HEV applications.

Taking the upper limits of the shaded band E of FIG. 5, the upper limit of peak power P density attainable for a selected given energy density E of prior art NiMH battery modules for use in HEV applications can therefore be represented by the following equation:

$$P = 1375 - 15E \qquad \text{Equation (1)}$$

where P is the maximum available peak power density (measured in W/Kg) attainable for a given energy density E (measured in Wh/Kg) The present invention permits operation of HEV systems of all types at peak power density levels in relation to energy density in the region that lies beyond these limits of the existing prior art, that is at levels higher than those defined by the above equation (1).

For example, a battery module embodying the present invention and having an energy density of about 70 Wh/Kg typically exhibits a peak power density of at least 600 W/Kg (shown at point F in FIG. 5) and can have a peak power density as high as 1,000 W/Kg (shown at point G in FIG. 5). These points establish a band of peak power to energy density relationships particularly suited to HEV applications and which are substantially beyond the capability of prior art NiMH batteries.

To give specific examples, an Ovonic 60 Ah HEV battery embodying the present invention and having an energy density of about 70 Wh/Kg provides a peak power of about 600 W/Kg. In another example, an Ovonic 30 Ah HEV battery embodying the invention and having an energy density of about 55 Wh/Kg provides a peak power of about 55 W/Kg. In a third example, an Ovonic 20 Ah HEV battery embodying the invention and having an energy density of about 50 Wh/Kg provides a peak power of about 600 W/Kg.

The battery may be initially charged from a separate power source such as through an outlet connected to a public utility system. The battery may also recharged to some extent by regenerative braking during deceleration.

Figure 6:
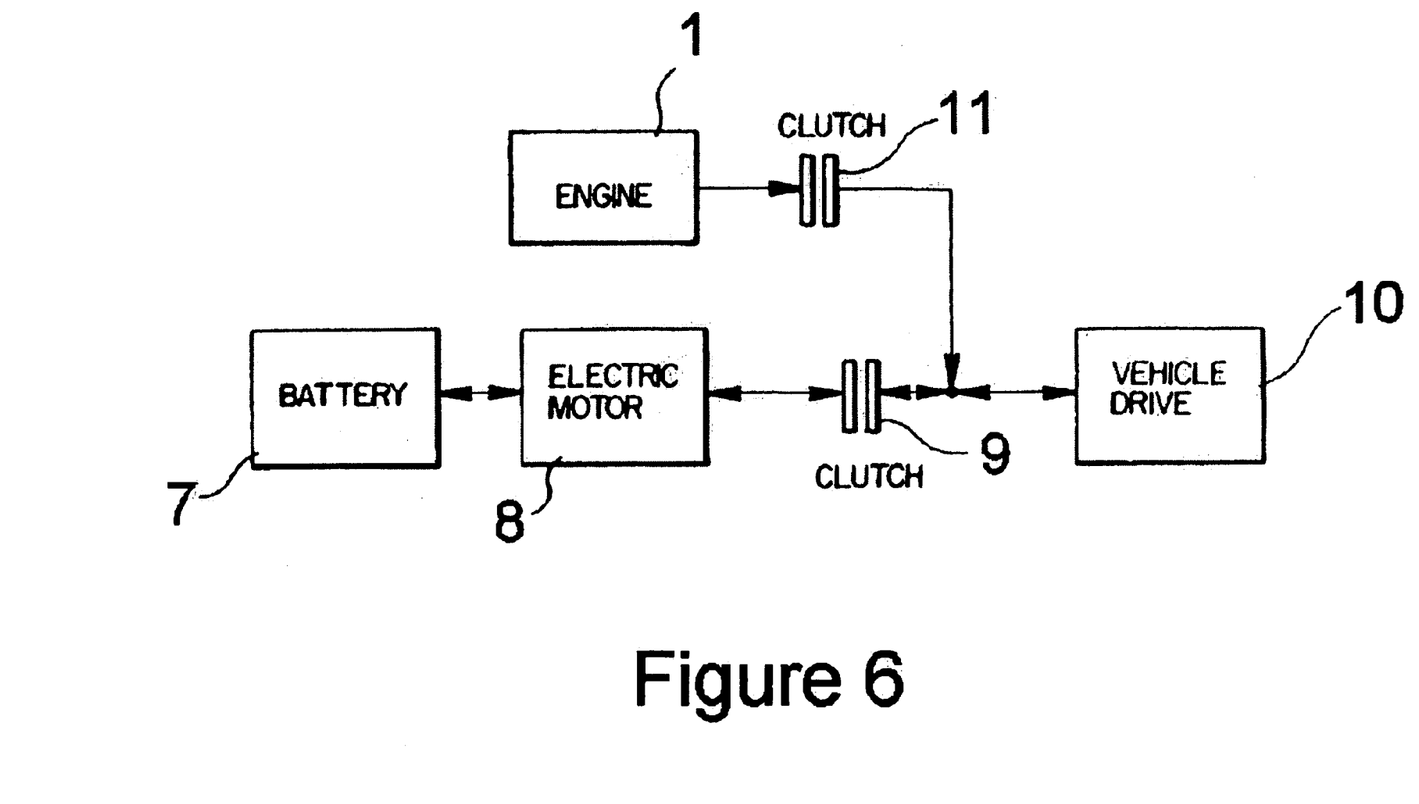
FIG. 6, shows a schematic representation of a parallel hybrid electric vehicle system in accordance with the present invention.

A parallel hybrid electric vehicle system is shown in FIG. 6. In the parallel type system, a battery 7 is connected to supply electrical power to an electric drive motor 8 which is able to be connected through a clutch 9 to a vehicle drive system 10. Connected in parallel with the electric drive path formed by the battery 7, the motor 8 and the clutch 9 is a hydrogen powered internal combustion engine 1 which is also able to be connected to the vehicle drive system 10. The vehicle can be driven by either the electric motor 8 when the clutch 9 alone is engaged or by the engine 1 when the clutch 11 alone is engaged, or by both the motor 8 and the engine 1 simultaneously when both clutches 9 and 11 are engaged at the same time.

In the parallel system as shown in FIG. 6, the combustion engine 1 may be sized much smaller than would otherwise be required to provide acceptable vehicle acceleration characteristics because the electric motor 8 can be engaged alone with the engine 1 to provide the desired acceleration. This means that, if the combustion engine is used for the primary drive mode, it can be operated at a much improved efficiency under steady state load and speed conditions.

Various combinations of the electric motor 8 and the combustion engine 1 are employed in parallel type systems. For example, in one system intended for use in city environments, vehicle propulsion is provided by the electric motor 8 alone when the vehicle is operated within the city. Outside of the city, the combustion engine 1 may be used for propulsion purposes. Various other combinations are also employed using the parallel type of connection as shown in FIG. 6.

Parallel type systems such as that shown in FIG. 6 are also operated in either the charge sustaining or charge depleting mode. As shown in the diagram of FIG. 6, generative power feedback can be provided to the battery during regenerative braking. Other connections (not shown) can also be provided to permit the hydrogen powered internal combustion engine 1 to provide recharging power to the battery 7 to implement a charge sustaining mode of operation.

In the "series-parallel" or "compound" HEV system, sometimes referred to as a "dual mode" system, a power splitter is used to take off some of the power from the combustion engine to drive a generator which provides recharging power to the battery. For the case of charge sustaining systems, where the battery is recharged during operation, a lower energy density is accepted and the emphasis is on a higher peak power for improved performance with a lower energy density being accepted as a trade off for increase in power density.

FIG. 5 has been divided into sectors depicting those regions in which the various forms of HEV systems would be operated. In the region CD, for example, systems which are of the charge depleting type would typically be operated. This is because the battery is not recharged during operation and the emphasis will thus be on a high energy density for maximum range. This region is also referred to as the "range extender" region.

For the case of charge sustaining systems, where the battery is recharged during operation, a lower energy density is accepted and the emphasis is on a higher peak power for improved performance with a lower energy density being accepted as a trade off for increase in power density. This region is designated CS in the diagram of FIG. 5. This region is also referred to as the "power assist" region.

Compound or dual mode systems would be operated in the region DS in between the regions CD and CS as shown in FIG. 5.

The parameter of peak power is determined in accordance with standards established by the United States Advanced Battery Consortium (USABC). According to these standards, peak power is measured with the battery module discharged to 50% depth of discharge. At this condition a current and corresponding power output which reduces the voltage of the battery to $2/3$ of its open circuit voltage held for a period of ten seconds is the peak power rating of the battery. This determination is made under normal temperature conditions in the range of about 30° C. to 35° C.

The energy density or specific energy E is measured for the battery module as designed for use in HEV applications. This determination is also made under normal temperature conditions in the range of about 30° C. to 35° C.

A battery module is an integral assembly of cells connected together and encased in a casing and having external electrical connections for connection to an external circuit or load.

As noted above, the present invention enables operation in the higher performance region above the band E for all HEV system types, i.e., charge depleting, charge sustaining and dual operation. Prior art NiMH battery systems for HEV applications are unable to provide performance in this enhanced performance region.

The power controlling means of the present invention that governs operation of the combustion engine and the electric motor at maximum efficiency of said nickel metal hydride batteries can be any known control device. Preferably, the power controlling means is a solid state integrated microelectronic device including AI algorithms that incorporate appropriate sensors and self-regulating and self-adjusting sub-routines. These permit constant adjustment of control parameters to attain maximum efficiency based on numerous external factors such as type of driving, average driving speed, ambient temperature, etc., as well as system factors such as engine temperatures, charge/discharge times and rates, battery temperatures, fuel consumption, etc.

The electrodes can also include current collection lines on the substrate. Such current collection lines have a higher electrical conductivity than the remainder of the substrate. This configuration assures high conductivity pathways from points remote from the current collecting tab on the electrode to the current collection tab. One embodiment of the current collection line comprises densifying portions of the porous metal substrate. Another embodiment comprises wires, ribbons or sintered powder electrically attached or embedded into the porous metal substrate. These attached or embedded components can be formed from nickel, copper, a copper alloy, nickel coated with copper or a copper alloy, or a copper material coated nickel.

A primary consideration of the present invention involves improving the power output of an Ovonic nickel-metal hydride (NiMH) rechargeable battery. (While reference is made specifically to Ovonic NiMH batteries, the principles described herein are applicable to all types of metal hydride battery systems regardless of their designation.) Generally, power output may be increased by lowering the internal resistance of the battery. Lowering the internal resistance decreases the power wasted due to heat dissipation within the battery, thereby increasing the power which is available to drive external loads. The internal resistance of a nickel-metal hydride battery can be decreased by increasing the conductivity of the battery components as well as the connections between the components. More specifically, the internal resistance can be decreased by increasing the conductivity of both the positive and negative electrodes of the battery.

The volumetric peak power density of the batteries of the present invention is generally $\geq 1500$ W/L, preferably $\geq 1800$ W/L, and most preferably $\geq 2700$ W/L. The specific peak power density of batteries of the present invention is generally $\geq 600$ W/kg, preferably $\geq 700$ W/kg, and most preferably $\geq 1000$ W/kg. In batteries of the present invention, it is usually necessary to sacrifice energy density in favor of power density. With this in mind, the volumetric peak energy density of the batteries of the present invention is generally between 130–250 Wh/L, preferably $\geq 150$ Wh/L, and most preferably $\geq 160$ Wh/L.

One of the disadvantages to using hydrogen as compared to a hydrocarbon fuel to power an internal combustion engine is that a reduction in power is realized when using hydrogen. To compensate for the power loss in the hydrogen powered internal combustion engine resulting from using hydrogen instead of a hydrocarbon based fuel, the battery may be modified accordingly. The batteries may be modified by increasing voltage or the power of the battery. The modified batteries may have a voltage at least 10% greater than the conventional 12 volt batteries. Preferably, the modified battery will provide a voltage greater than 12 volts. More preferably, the modified battery will provide a voltage greater than or equal to 24 volts. Most preferably, the battery will provide a voltage greater than or equal to 36 volts.

The foregoing is provided for purposes of explaining and disclosing preferred embodiments of the present invention. Modifications and adaptations to the described embodiments, particularly involving changes to the cylinder deactivation strategy, the operating conditions of the hydrogen engine, and the control system will be apparent to those skilled in the art. These changes and others may be made without departing from the scope or spirit of the invention in the following claims.

What is claimed is:

1. A hybrid electric vehicle comprising:
    a throttleless hydrogen powered internal combustion engine including one or more cylinders supplied with one or more unthrottled air streams, said one or more unthrottled air streams being supplied with hydrogen prior to entering said one or more cylinders;
    an electric motor supplementing said hydrogen internal combustion engine;
    a rechargeable battery for powering said electric motor; and
    a metal hydride hydrogen storage unit in gaseous communication with said one or more unthrottled air streams, said metal hydride hydrogen storage unit including a pressure containment vessel at least partially filled with a hydrogen storage alloy.

2. The hybrid electric vehicle according to claim 1, further comprising a hydrogen fuel control system.

3. The hybrid electric vehicle according to claim 2, wherein said hydrogen fuel control system provides a fuel control signal to one or more hydrogen fuel injectors in gaseous communication with said one or more unthrottled air streams based on the position of an accelerator pedal and the speed of said throttleless hydrogen internal combustion engine, said fuel control signal controlling the amount of hydrogen injected into said one or more unthrottled air streams.

4. The hybrid electric vehicle according to claim 3, wherein during idling or light load conditions one or more of said hydrogen fuel injectors cease injecting hydrogen into one or more of said unthrottled air streams.

5. The hybrid electric vehicle according to claim 1, wherein said one or more air streams entering said one or more cylinders have a $\lambda$ value between 1 and 10.

6. The hybrid electric vehicle according to claim 5, wherein said one or more air streams entering said one or more cylinders have a $\lambda$ value between 3 and 8.

7. The hybrid electric vehicle according to claim 6, wherein said one or more air streams entering said one or more cylinders have a $\lambda$ value between 5 and 7.

8. The hybrid electric vehicle according to claim 1, wherein said throttleless hydrogen powered internal combustion engine has a compression ratio between 12:1 and 15:1.

9. The hybrid electric vehicle according to claim 8, wherein said throttleless hydrogen powered internal combustion engine has a compression ratio of 13:1.

10. The hybrid electric vehicle according to claim 1, wherein said rechargeable battery compensates for power loss resulting from powering said throttleless hydrogen powered internal combustion engine with hydrogen instead of a hydrocarbon fuel.

11. The hybrid electric vehicle according to claim 1, wherein said rechargeable battery provides a voltage greater than or equal to 12 volts.

12. The hybrid electric vehicle according to claim 1, wherein said rechargeable battery provides a voltage greater than or equal to 24 volts.

13. The hybrid electric vehicle according to claim 1, wherein said rechargeable battery provides a voltage greater than or equal to 36 volts.

14. The hybrid electric vehicle of claim 1, wherein said rechargeable battery has a peak power density of at least 700 Watts/kilogram.

15. The hybrid electric vehicle of claim 1, wherein said rechargeable battery has an energy density of at least 70 Watt-hours/kilogram.

16. The hybrid electric vehicle of claim 1, wherein said rechargeable battery has a peak power density of at least 1000 Watts/kilogram.

17. The hybrid electric vehicle of claim 1, wherein an exhaust stream from said throttleless hydrogen powered internal combustion engine is in thermal contact with said hydrogen storage alloy.

* * * * *